(12) United States Patent
Tomazic et al.

(10) Patent No.: US 8,887,702 B2
(45) Date of Patent: Nov. 18, 2014

(54) SELF-CLEANING EXHAUST GAS RECIRCULATION SYSTEM

(75) Inventors: Dean Tomazic, Orion Township, MI (US); Marek Tatur, Pleasant Ridge, MI (US)

(73) Assignee: FEV GmbH, Aachen (DE)

( * ) Notice: Subject to any disclaimer, the term of this patent is extended or adjusted under 35 U.S.C. 154(b) by 1055 days.

(21) Appl. No.: 12/873,900

(22) Filed: Sep. 1, 2010

(65) Prior Publication Data
US 2012/0048216 A1    Mar. 1, 2012

(51) Int. Cl.
*F02B 47/08* (2006.01)
*F02M 25/07* (2006.01)

(52) U.S. Cl.
CPC ......... *F02M 25/0707* (2013.01); *F02M 25/071* (2013.01); *Y02T 10/121* (2013.01); *F02M 25/0742* (2013.01); *F02M 25/0718* (2013.01); *F02M 25/0739* (2013.01)
USPC .................. 123/568.12; 123/568.15; 701/108; 60/114.74

(58) Field of Classification Search
USPC .............. 123/1 A, 3, 568.12, 568.15, 568.16, 123/568.21; 701/103, 108; 60/278, 286; 73/114.74
See application file for complete search history.

(56) References Cited

U.S. PATENT DOCUMENTS

| 4,541,367 A | * | 9/1985 | Lindberg | 123/568.15 |
| 8,065,991 B2 | * | 11/2011 | Kuroki et al. | 123/568.15 |

FOREIGN PATENT DOCUMENTS

| JP | 2007187111 A | * | 7/2007 | | 123/568.15 |
| WO | WO-2007027327 A2 | | 3/2007 | | |

* cited by examiner

*Primary Examiner* — Erick Solis
*Assistant Examiner* — Anthony L Bacon
(74) *Attorney, Agent, or Firm* — Gifford, Krass, Sprinkle, Anderson & Citkowski, P.C.

(57) ABSTRACT

The present invention provides an internal combustion engine with a self-cleaning exhaust gas recirculation (EGR) system. The engine can have an intake, a combustion chamber, and an exhaust with the EGR system accepting exhaust gas from the exhaust and supplying exhaust gas to the intake. The internal combustion engine also has a hydrogen source in fluid communication with a hot side of the EGR system, the hydrogen source affording hydrogen to flow into and through the EGR system and remove at least a portion of carbon-containing deposits therewithin.

20 Claims, 1 Drawing Sheet

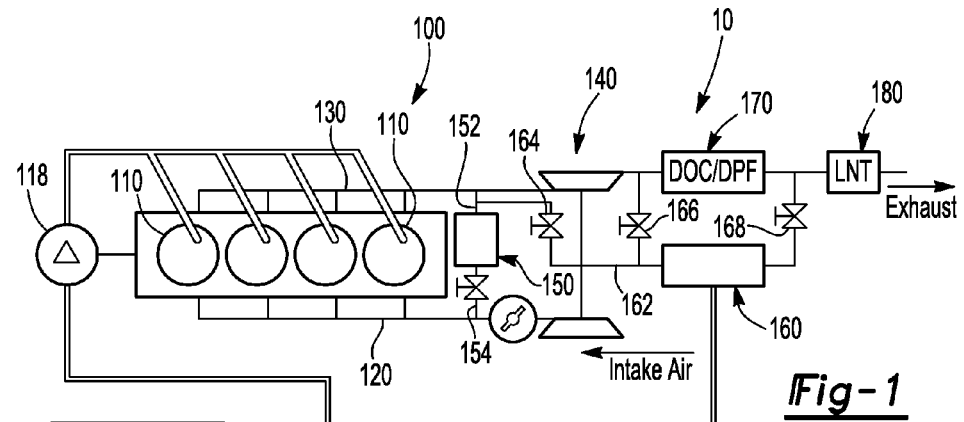
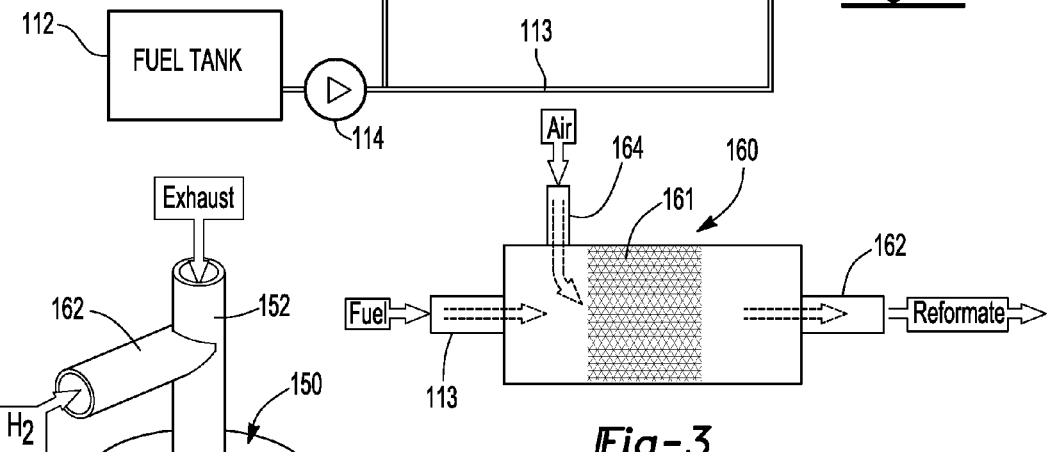
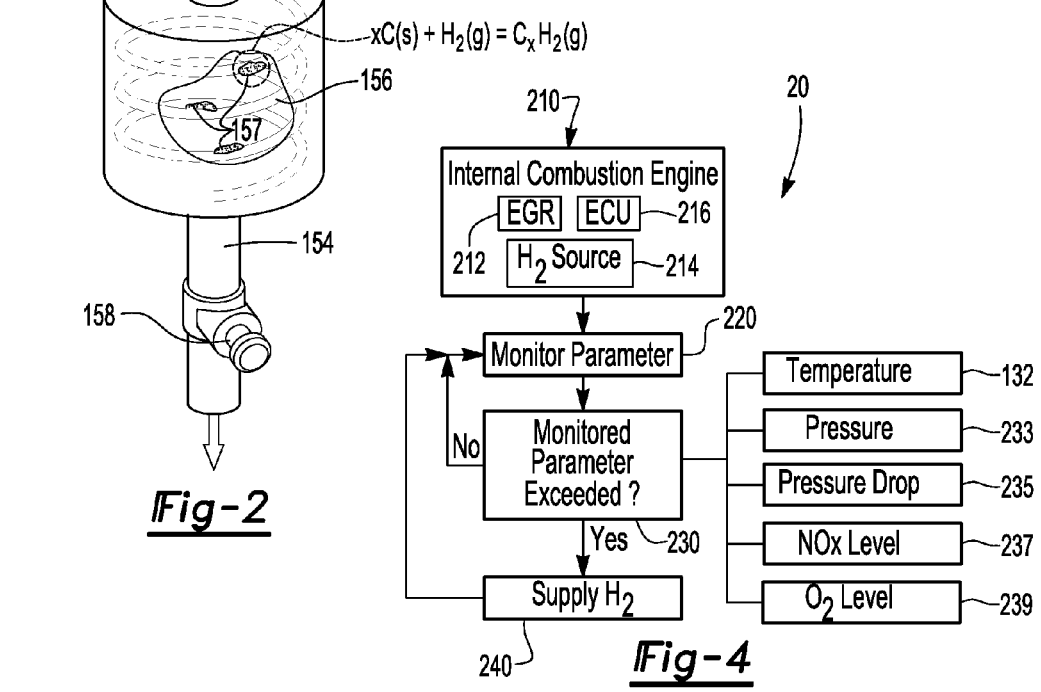

SELF-CLEANING EXHAUST GAS RECIRCULATION SYSTEM

FIELD OF THE INVENTION

The present invention is related to an internal combustion engine having an exhaust gas recirculation system and, in particular, an internal combustion engine having a self-cleaning exhaust gas recirculation system.

BACKGROUND OF THE INVENTION

The use of exhaust gas recirculation (EGR) systems for recirculating a portion of an internal combustion engine's exhaust gas back to cylinders of the engine is known. In gasoline engines, the relatively inert exhaust gas displaces combustible matter in the cylinder and thereby affords for a reduced heat of combustion with the same pressure produced against the piston at lower temperatures. In diesel engines, the exhaust gas replaces some of the excess oxygen in the pre-combustion mixture. Since NOx formation is a function of temperature, the EGR systems reduce the amount of NOx produced by the engine due to the lower heat of combustion and thus lower temperatures.

The EGR system typically includes a cooler that cools exhaust gas flowing therethrough, thereby further reducing the heat of combustion within a given cylinder. However, cooling of the exhaust gas can result in the formation of carbon-containing deposits on the cooler. Such deposit formation can reduce the efficiency of the cooler by retarding heat transfer from the exhaust gas to the cooler. In addition, deposit formation can restrict the flow of exhaust gas through the EGR system and/or cause an increase in temperature of the EGR system. Therefore, it is not uncommon for the cooler to be replaced during the warranty period and/or lifetime of a motor vehicle with an EGR system. As such, an internal combustion engine having a self-cleaning EGR system and a process for cleaning the EGR system during operation of the internal combustion engine would be desirable.

SUMMARY OF THE INVENTION

The present invention provides an internal combustion engine with a self-cleaning exhaust gas recirculation (EGR) system. The engine can have an intake, a combustion chamber, and an exhaust, along with EGR system (hereafter referred to as simply EGR). The EGR can have an exhaust gas inlet and an exhaust gas outlet and is operable to accept exhaust gas from the exhaust and supply exhaust gas to the intake. The internal combustion engine also has a hydrogen source in fluid communication with a hot side of the EGR and a valve between the hydrogen source and the EGR that is operable to allow, and prevent, hydrogen from the hydrogen source to flow into the EGR. The hydrogen reacts with and affords for removal of carbon-containing deposits within the EGR and thereby cleans the EGR during normal operation of the engine.

In some instances, the EGR system has a cooler and the hydrogen from the hydrogen source can remove deposit formation on the cooler in the event that exhaust gas flowing through the EGR deposits carbon (C)-containing matter onto the cooler. The hydrogen source can be a reformer unit that has a reformate line extending from the reformer to the hot side of the EGR. The reformer unit can produce hydrogen by converting fuel used by the internal combustion engine into hydrogen and a C-containing molecule such as carbon monoxide. The valve, sometimes referred to as a dosing valve, can be operable to release reformate from the reformer when a predefined pressure therewithin is exceeded. In the alternative, the dosing valve can be operable to release reformate from the reformer when the EGR experiences a predefined pressure drop and/or exceeds a predefined temperature, NOx level, oxygen level, and the like.

A process for cleaning the EGR is also provided. During operation of the internal combustion engine, carbon deposits resulting from the cooling of exhaust gas flowing through the EGR form therewithin. Thereafter, hydrogen gas is released from the hydrogen source via the dosing valve, the hydrogen gas flowing into the EGR and reacting with at least a portion of the deposit formation. The reaction of the hydrogen gas with the deposit formation produces a gaseous product that flows from the EGR into the intake, and possibly into the combustion chamber, thereby resulting in removal of at least a portion of the C-containing deposit from the EGR. The C-containing deposits can be located on the cooler and/or on an EGR valve that is part of the EGR system. As such, the hydrogen flowing through the EGR system can clean the cooler, the EGR valve, and/or other areas and components therewithin. In addition, hydrogen gas flowing through the EGR system can flow into the intake of the internal combustion engine and result in the reduction of any deposits located within the intake. The same is true for any intake ports, valves, etc., for cylinders of the internal combustion engine.

BRIEF DESCRIPTION OF THE DRAWINGS

FIG. 1 is a schematic illustration of an internal combustion engine according to an embodiment of the present invention;

FIG. 2 is a schematic illustration of an exhaust gas recirculation system shown in FIG. 1;

FIG. 3 is a schematic illustration of a reformer shown in FIG. 1; and

FIG. 4 is a schematic diagram of a process according to an embodiment of the present invention.

DETAILED DESCRIPTION OF THE INVENTION

The present invention provides an internal combustion engine having a self-cleaning exhaust gas recirculation (EGR) system and a process for cleaning an EGR system (hereafter referred to simply as EGR) during normal operation of the internal combustion engine. As such, the present invention has utility as a component for a motor vehicle.

The engine can be most any internal combustion engine known to those skilled in the art with an intake, a combustion chamber and an exhaust. For example and for illustrative purposes only, the engine can have a plurality of cylinders with pistons therewithin, an intake manifold, intake ports for the cylinders, intake valves, exhaust ports, exhaust valves, an exhaust manifold, exhaust tubing, and the like. The internal combustion engine can be a petrol/gasoline engine or a diesel engine. In addition, the internal combustion engine can burn alternative fuels such as natural gas, biofuels and the like.

The engine also has an EGR that recirculates a portion of exhaust gas produced by the engine. The EGR can have an exhaust gas inlet and an exhaust gas outlet, the exhaust gas inlet being in fluid communication with the exhaust of the engine and where exhaust gas is accepted from the exhaust and enters the EGR. It is appreciated that an exhaust inlet valve may or may not be included as part of the exhaust gas inlet. It is further appreciated that the exhaust gas outlet is where exhaust gas from the EGR is supplied to the intake of the engine and may or may not include an exhaust outlet valve.

A hydrogen source is further included and is in fluid communication with a hot side of the EGR. A dosing valve can be located between the hydrogen source and the EGR system and is operable to allow, and prevent, hydrogen gas from the hydrogen source to flow into the EGR.

It is appreciated that during operation of the internal combustion engine, the EGR can have or form carbon (C)-containing deposits therewithin which can reduce the efficiency of the EGR and engine. For example and for illustrative purposes only, the EGR can have a cooler that functions to cool the exhaust gas flowing therethrough and the cooler can become fouled or at least partially clogged by the formation or deposition of C-containing deposits on the cooler. Naturally, the fouling of the cooler reduces the efficiency of the EGR by reducing heat transfer between the exhaust gas and the cooler, blocking flow of the exhaust gas through the EGR, increasing pressure across the EGR and the like.

In order to prevent the need for regular maintenance to clean the EGR, or even the need to replace the EGR and/or cooler, hydrogen from the hydrogen source flows through the EGR and reacts with the C-containing deposits to form a C-containing gaseous product that flows out of the EGR into the intake and possibly into the combustion chamber of the engine. In this manner, a self-cleaning EGR system is provided, i.e. C-containing deposits within the EGR are reduced and/or removed and the efficiency of the EGR is maintained during extended operation of the engine.

The hydrogen source can be a reformer unit that converts fuel such as gasoline, diesel, and the like into hydrogen gas and a carbon-containing gas such as carbon monoxide. Any reformer unit known to those skilled in the art can be used so long as sufficient quantities of hydrogen gas are produced. For example and for illustrative purposes only, reformers working on a catalytic basis that use precious metals, or in the alternative, reformers that do not use precious metals but deliver a reformate that consists of approximately 80-85 percent hydrogen and 15-20 percent carbon monoxide can be used. However, it is appreciated that any hydrogen source such as a gaseous and/or liquid hydrogen storage tank can be used. In addition, the use of a hydrogen storage tank to supplement a reformer is within the scope of the present invention. Likewise, solid hydrogen storage materials can be used as the hydrogen source and/or as a supplement to a reformer.

It is appreciated that the present invention can be used with any internal combustion engine independent of fuel and engine type, cylinder arrangement, size, and the like. In addition, the cleaning system and process can be used in combination with an existing after-treatment configuration and thus requires only one additional valving mechanism that affords for appropriate reformate metering into the EGR exhaust gas stream. Depending on the time of actuation, a potential reduction in the conventional engine fueling can be considered and implemented in order to avoid unnecessary overfueling.

The induction of reformate into the EGR can occur in predefined and desirable time increments for a certain time duration and/or under predefined and desirable boundary conditions such as engine idle. It is further appreciated that separate hydrogen sources and/or supply systems can significantly increase an operating window for cleaning of the EGR due to higher pressure capabilities and the like. In addition, separate hydrogen supply systems can serve as potential backup solutions in the event that engine operation does not accommodate or line up with actuation requirements of a reformer.

Adding reformate to the EGR thus reduces and/or eliminates fouling of the EGR cooler and/or EGR valve. As such, cooling performance of the EGR can be maintained and provide constant emissions over an engine/motor vehicle lifetime. Furthermore, deposit formation on the EGR valve can be reduced or avoided and thereby afford for reduced flow restrictions and improved flow control. In this manner, warranty, maintenance and/or repair costs for both components, that is the EGR cooler and the EGR valve, can be reduced.

Even more benefits can be provided in that increased hydrogen content within the combustion chamber of the engine can provide more efficient and cleaner burning therewithin and thus less harmful emissions therefrom. The cleaning effect can be extended to the intake manifold and inlet ports of the engine and thereby afford improved engine efficiency due to reduced deposit formation and improved cylinder filling (volumetric efficiency), reduced pumping losses, and the like.

Turning now to FIG. 1, a schematic illustration of an internal combustion engine is shown generally at reference numeral 10. The engine 10 can include an engine block 100 having one or more cylinders 110. Each of the cylinders 110 can have a piston 111 as known to those skilled in the art and a fuel tank 112 with a first fuel pump 114 and an optional second fuel pump 118 can provide fuel to the cylinders 110. An intake 120, for example an intake manifold, provides intake air to the pistons 111 and an exhaust 130 handles exhaust gas expelled from the cylinder 110. The engine 10 can optionally include one or more turbochargers 140 that use the exhaust gas to drive a turbine and increase intake air delivered to the cylinders 110, however this is not required. In the event that more than one turbocharger 140 is included, the turbochargers can be arranged in-line, sequential or parallel.

An EGR system 150 is provided and is in fluid communication with the air intake 120 and the exhaust 130. The first fuel pump 114 can provide fuel via a fuel line 113 to a reformer 160, the reformer 160 operable to produce and provide hydrogen gas via a reformate line 162 and a dosing valve 164 to a hot side, e.g. to an exhaust inlet 152, of the EGR 150. It is appreciated that the term "hot side" refers to the upstream or inlet side of the EGR system 150. Likewise, the downstream or outlet side of the EGR system 150 can be referred to as the "cold side".

In some instances, a diesel oxidation catalyst (DOC) located upstream a diesel particulate filter (DPF) 170 and/or a lean NOx trap (LNT) can be provided as part of the exhaust 130. During operation of the engine 10, fuel from the fuel tank 112 is supplied to the reformer 160, the reformer 160 producing hydrogen gas. Hydrogen gas is supplied to the hot side of the EGR 150 via the reformate line 162. The hydrogen gas cleans the EGR 150, the EGR valve 152, and/or the inlet 120 when it flows therethrough.

Looking now at FIG. 2, a more detailed view of the EGR 150 is shown with a cooler 156 illustrated with C-containing deposits 157 thereon. Exhaust gas enters into the EGR 150 through the exhaust inlet 152 and exits therefrom through an exhaust outlet 154. An EGR valve 158 can be included which may or may not have or develop C-containing deposits thereon resulting from the recirculated exhaust gas. Hydrogen gas is supplied to the hot side of the EGR 150 through the reformate line 162, and upon contacting the C-containing deposits 157, reacts therewith and produces a gaseous C-containing product which can flow out of the EGR 150. In this manner, at least a portion of the deposits 157 are removed from the cooler 156.

As stated above, any reformer known to those skilled in the art can be used, illustratively including a reformer 160 as shown in FIG. 3. The fuel can enter the reformer 160 through fuel line 113 and in combination with air supplied by an air inlet 164 pass through a catalyst 161 to produce reformate containing hydrogen gas and one or more carbon-containing molecules such as carbon monoxide. The reformate containing the hydrogen gas travels through the reformate line 162 to the hot side of the EGR system 150. In some instances, the reformate can also be provided to the upstream side of the DOC/DPF 170 and/or the upstream side of the LNT 180 as shown in FIG. 1. Valves 166 and/or 168 control flow of the reformate to the upstream side of the DOC/DPF 170 and/or LNT 180, respectively. As stated above, a separate hydrogen source can replace or supplement the reformer 160.

Turning now to FIG. 4, a process for cleaning an EGR is shown generally at reference numeral 20. The process 20 can include providing an internal combustion engine 210, the internal combustion engine 210 having an EGR 212, a hydrogen source 214, and optionally an electronic control unit 216. After the internal combustion engine is provided, one or more operating parameters of the engine is monitored at step 220. The parameter that is monitored can include, but is not limited to, temperature 231 of the EGR 212, pressure 233 within the hydrogen source 214, pressure drop 235 across the EGR 212, a NOx level 237 of the EGR 212, an $O_2$ level 239 of the EGR 212, and the like. At step 230, the ECU 216 determines whether or not the monitored parameter has been exceeded. If the monitored parameter has not been exceeded, monitoring of the parameter continues at step 220. In the event that the monitored parameter is exceeded above a predefined level, hydrogen is supplied to the hot side of the EGR system 212 at step 240. In addition, after and/or during the supply of hydrogen at step 240, the parameter is monitored at step 220. In this manner, a self-cleaning EGR system for an internal combustion engine is provided. Furthermore, the measured and/or calculated loading status of the DPF and/or LNT using the ECU and/or different sensors in an aftertreatment (AT) system of a vehicle vehicle can also trigger release of hydrogen from the reformer into the exhaust system via 166 and/or 168 to regenerate the DPF or regenerate/de-sulfurize the LNT.

The invention is not restricted to the illustrative examples or embodiments described above. The examples or embodiments are not intended as limitations on the scope of the invention. Processes, methods, apparatus, compositions, and the like described herein are exemplary and not intended as limitations on the scope of the invention. Changes therein and other uses will occur to those skilled in the art. The scope of the invention is defined by the scope of the claims.

We claim:

1. An internal combustion engine comprising:
   an intake, a combustion chamber and an exhaust;
   an exhaust gas recirculation (EGR) system having an exhaust gas inlet and an exhaust gas outlet, said EGR system operable to accept exhaust gas from said exhaust and supply said exhaust gas to said intake;
   a hydrogen source in fluid communication with a hot side of said EGR system, said hydrogen source being a reformer unit having a reformate line extending from said reformer unit to said hot side of said EGR system; and
   a valve between said hydrogen source and said EGR system operable to allow and prevent hydrogen from said hydrogen source to flow into said EGR system.

2. The internal combustion engine of claim 1, wherein said EGR system has a cooler, said hydrogen from said hydrogen source operable to remove deposit formation on said cooler when said exhaust gas deposits carbon onto said cooler and hydrogen flows into said EGR system.

3. The internal combustion engine of claim 1, further including a dosing valve located between said reformer unit and said EGR system.

4. The internal combustion engine of claim 3, wherein said dosing valve is operable to release reformate from said reformer unit when said reformate exceeds a predefined pressure.

5. The internal combustion engine of claim 3, wherein said dosing valve is operable to release reformate from said reformer unit when said EGR system exceeds a predefined pressure drop.

6. The internal combustion engine of claim 3, wherein said dosing valve is operable to release reformate from said reformer unit when said EGR system exceeds a predefined temperature.

7. The internal combustion engine of claim 3, wherein said dosing valve is operable to release reformate from said reformer unit when a NOx level within said EGR system exceeds a predefined NOx level.

8. The internal combustion engine of claim 3, wherein said dosing valve is operable to release reformate from said reformer unit when an $O_2$ level within said EGR system exceeds a predefined $O_2$ level.

9. A process for cleaning an exhaust gas recirculation (EGR) system of an internal combustion engine, the process comprising:
   providing an internal combustion engine having:
      an intake, a combustion chamber and an exhaust;
      an exhaust gas recirculation (EGR) system having an exhaust gas inlet and an exhaust gas outlet, said EGR system operable to accept exhaust gas from said exhaust and supply said exhaust gas to said intake;
      a hydrogen source in fluid communication with a hot side of the EGR system; and
      a dosing valve between the hydrogen source and the hot side of the EGR system, the dosing valve operable to allow a predefined dose of hydrogen gas from the hydrogen source to flow into the EGR system;
   burning a fuel within the combustion chamber until the EGR system needs cleaning due to fuel deposit formation therewithin;
   releasing hydrogen gas from the hydrogen source via the dosing valve, the hydrogen gas flowing into the EGR system and reacting with at least a portion of the deposit formation to form a gaseous product that flows from the EGR system into the intake and cleans the EGR system.

10. The process of claim 9, wherein the hydrogen gas reduces deposit formation on an EGR cooler within the EGR system.

11. The process of claim 9, wherein the hydrogen gas reduces deposit formation on an EGR valve that is part of the EGR system.

12. The process of claim 9, wherein at least a portion of the hydrogen gas flows into the intake, into the combustion chamber and is combusted with the fuel.

13. The process of claim 12, wherein the hydrogen gas reduces deposit formation within the intake.

14. The process of claim 12, further including providing an inlet port for the combustion chamber, the hydrogen gas reducing deposit formation on the inlet port.

15. The process of claim 9, wherein the hydrogen source is a reformer operable to convert the fuel into hydrogen gas.

16. The process of claim 15, wherein the fuel is selected from a group consisting of diesel fuel, gasoline, natural gas and combinations thereof.

17. A process for cleaning an exhaust gas recirculation (EGR) system for an internal combustion engine having a piston, a cylinder, an intake manifold and an exhaust system, the process comprising:
provided a reformer operable to produce hydrogen gas, the reformer having a dosing valve and a reformate line in fluid communication with a hot side of the EGR system;
operating the internal combustion engine by burning a fuel in the cylinder and producing an exhaust gas;
recirculating at least a portion of the exhaust gas through the EGR system, through the intake manifold, through the cylinder and into the exhaust system, the recirculation of the exhaust gas resulting in deposit formation within the EGR system;
producing hydrogen gas in the reformer; and
flowing at least a portion of the hydrogen gas through the reformate line and into the EGR system, the hydrogen gas reacting with and removing at least a portion of the deposit formation from the EGR system.

18. The process of claim 17, wherein said EGR system has a cooler with at least a portion of the deposit formation thereon, the hydrogen gas removing at least a portion of the deposit formation on the cooler.

19. The process of claim 17, further including an electronic control unit operable to monitor a parameter of the EGR system and actuating the dosing valve to open when the parameter exceeds a predefined value.

20. The process of claim 19, wherein the parameter is selected from a group consisting of a pressure in the reformer, a pressure drop across the EGR system, a temperature of the EGR system, a NOx level within the EGR system, an $O_2$ level within the EGR system and combinations thereof.

* * * * *